May 8, 1962     H. SPIESS     3,033,577

OIL SEAL

Filed Feb. 4, 1959

INVENTOR:
HANS SPIESS
by
Frederick Breitenfeld
Attorney

3,033,577
OIL SEAL
Hans Spiess, Kempraten, Rapperswil, Switzerland, assignor to Oerlikon Engineering Company, Zurich, Switzerland, a corporation of Switzerland
Filed Feb. 4, 1959, Ser. No. 791,089
Claims priority, application Switzerland Feb. 19, 1958
2 Claims. (Cl. 277—3)

This invention relates to machines in which a gas, such as hydrogen, is maintained under pressure within the machine housing for the purpose of cooling the machine parts. More particularly, the invention relates to an annular sealing member for such a machine located between the machine housing and the rotating shaft of the machine.

In these machines, the rotating shaft is ordinarily provided with a flange against which the sealing member is urged, usually by a combination of the force of a spring and the pressure of the gas within the machine housing. Since the seal is a stationary member, a lubricating oil film is provided between the seal and the rotating flange.

In most cases, the machine is so designed that the pressure of the gas within the housing increases, as the speed of the machine increases, in order to increase the cooling effect of the gas. As the gas pressure increases, it exerts a greater force on the sealing member in the direction of the flange on the machine shaft. Consequently, the lubricating oil film between seal and flange is squeezed thinner and thinner whereby its effectiveness is severly reduced or eliminated. On the other hand, when the machine slows down and the gas pressure within the housing falls, the seal moves away from the flange thereby permitting the oil to leak into the housing. This is disadvantageous since the oil contaminates the hydrogen or other gas employed, and the oil vapor that is produced soils the interior of the machine.

It is a principal object of this invention to provide a seal of the character described whose relative position with respect to the flange is not dependent upon the pressure of the gas within the machine housing. More specifically, it is an object of the invention to provide such a seal wherein the force with which the seal is urged toward the flange remains constant regardless of the pressure variations of the gas within the housing of the machine. As a result, no matter what the speed of the machine (assuming gas pressure varies with speed) the oil between the seal and flange will never tend to be squeezed out or leak into the machine housing.

Other objects and advantages of the invention will be apparent from the following description in which reference is made to the accompanying drawings.

Figure 1:
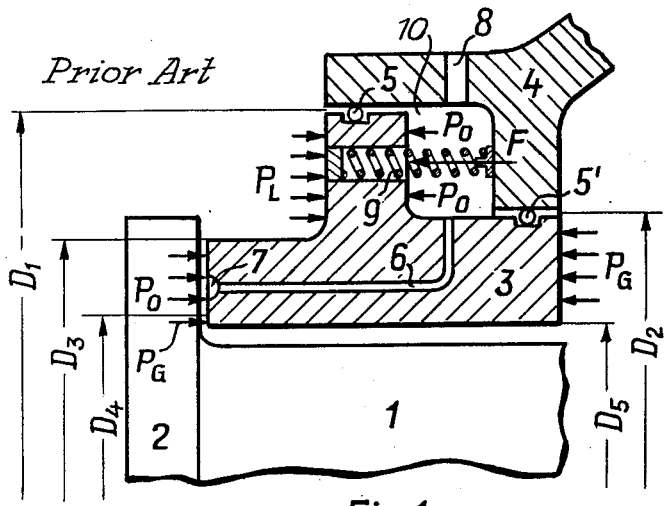
FIG. 1 is a fragmentary cross-sectional view of a sealing member constructed according to the prior art, the section being taken along a diameter of the seal.

Referring to FIG. 1, a machine shaft 1, rotatably supported (by means not shown) within a housing 4, is provided at its end with a radially extending flange 2. Within the housing is a gas under pressure for cooling the machine. In order to prevent the escape of the gas, an annular sealing member 3 is provided between the housing 4 and the flange 2.

The sealing member 3 and housing 4 are so mutually configured as to form an annular oil supply chamber 10 to which oil under pressure is fed from an external source (not shown in FIG. 1) through a hole 8 in the housing. A series of conduits 6 are provided in the seal 3 for connecting the chamber 10 to the interface between the flange 2 and the seal 3. A lubricating oil film is thereby set up between the stationary sealing member and the rotating flange (see FIG. 4). The face of the seal opposed to the flange is provided with an oil ring groove 7. In order to effect a liquid-tight sealing for the chamber 10, flexible packings or O-rings 5 and 5' are located between the seal and the housing. A number of compression springs 9 are usually provided for biasing the sealing member 3 toward the flange 2. Only one such spring is shown in FIG. 1.

In addition to the force of the springs 9, a force produced by the pressure of the gas within the housing urges the seal toward the flange. It is this latter force which may, when the pressure of the gas becomes very high, force the oil between the seal-flange interface to be squeezed out.

The problem will be more readily understood if the forces acting on the sealing member in the horizontal or axial direction are considered. In FIG. 1, $P_L$ represents the air pressure on the sealing member; $P_O$ the oil pressure; $P_G$ the gas pressure; and $F$ the force of the springs 9. The diameters of certain portions of the sealing arrangement are indicated by the designations $D_1$ to $D_5$. $D_1$ is the diameter of the flexible packing 5 which is the packing closer to the flange 2; $D_2$ is the diameter of the other packing 5'; $D_3$ is the diameter of the outer edge of the surface of the sealing member opposed to the flange 2; $D_4$ is the assumed diameter of the inner edge of the oil film between the seal and flange; and $D_5$ is the internal diameter of the sealing member.

Summing up the forces on the sealing member in the horizontal direction, and combining terms, results in the following expression:

$$\Sigma H = P_G(D_1^2 - D_3^2)\pi/4 + \Delta p(D_1^2 - D_2^2 - D_3^2 + D_4^2)\pi/4 - P_L(D_1^2 - D_3^2)\pi/4 + F$$

$\Delta p = P_O - P_G$, i.e. the difference between the pressure of the oil and the pressure of the gas. In practice, this pressure differential often varies between 0.2 and 1.0 atmosphere. The above equation clearly brings out the effect of gas pressure on the sealing member. Since it is advantageous to employ a gas pressure ($P_G$) much higher than air pressure ($P_L$) in order to produce good cooling, the force produced on the sealing member 4 by the gas pressure can increase to such an extent that the oil film at the seal-flange interface will be thinned-out to a degree where it no longer affords adequate lubrication.

Figures 2, 3, 4:
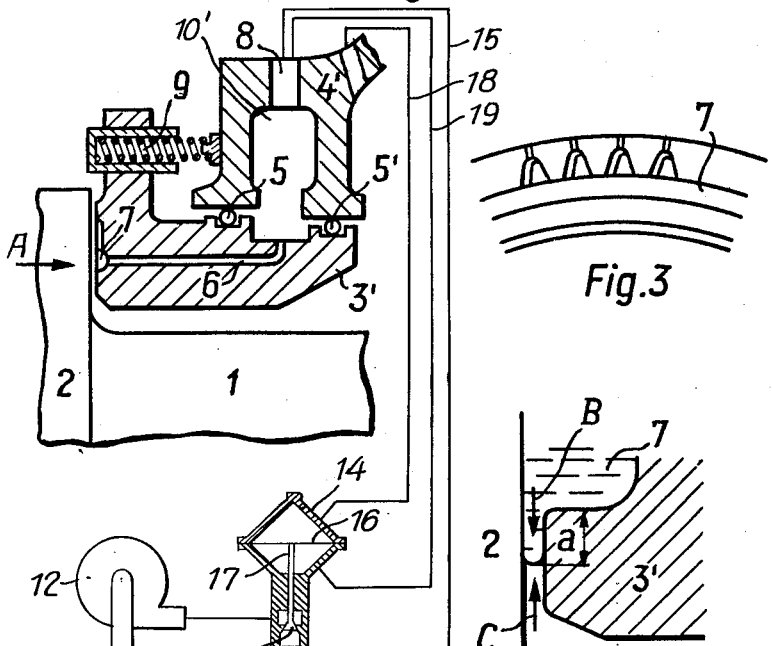
FIG. 2 is a view similar to FIG. 1 showing a sealing member constructed in accordance with the present invention.
FIG. 3 is a fragmentary view of the face of the sealing member which is opposed to the flange on the machine shaft looking in the direction of the arrow "A" in FIG. 2.
FIG. 4 is an enlarged view of a portion of FIG. 2.

It has been discovered that if two conditions, illustrated in FIG. 2, are present in a seal of this type, the resultant of all the horizontal forces on the sealing member 3' will remain constant regardless of the pressure variations of the gas within the housing 4' of the machine. Consequently, the seal will never be pushed toward the flange 2 with a force great enough to squeeze out the oil film. These two conditions are (1) that the pressure of the oil film between the seal and flange be maintained at a constant differential above the pressure of the gas within the machine housing, i.e., $\Delta p = P_O - P_G =$ constant, and (2) that the diameter of the flexible packing 5 closer to the flange 2 be equal to the external diameter of the interface between the seal and flange, i.e., $D_1 = D_3$.

When these two conditions ($\Delta p = C$; $D_1 = D_3$) are introduced into the equation set out above, the equation becomes:

$$\Sigma H = C(D_4^2 - D_2^2)\pi/4 + F$$

All the terms on the right side of this equation are constants. Hence, regardless of the value of the gas pressure within the machine housing, the resultant horizontal force on the seal will be constant.

A known type of means is shown schematically in FIG. 2 for maintaining the oil-gas pressure differential constant. A pump 12 delivers oil under pressure from a reservoir (not shown) to the chamber 10' via the valve member 13 of a differential valve 14, a conduit 15, and the hole 8. The differential valve 14 includes a diaphragm 16 and a stem 17 connecting the diaphragm to the valve member 13. The valve member controls the flow of oil from the pump to the sealing member, and the position of the diaphragm controls the setting of the valve member. By means of the conduits 18 and 19, the gas pressure within the machine is applied to the upper side of the diaphragm 16, and the oil pressure is applied to the lower side of the diaphragm. The diaphragm is biased by an adjustable spring force (the spring not being shown) whereby the pressure of the oil may be maintained constant at any desired differential above the gas pressure.

Referring to FIG. 4, it will be seen that the oil film between the seal and flange extends inwardly from the oil ring groove 7. As mentioned above, it is undesirable for oil to leak into the machine housing, hence preferably, the oil should be permitted to extend inwardly from the oil ring groove, only about a distance "a." The distance that the oil film penetrates past the oil ring groove is influenced by the oil pressure "B," gas pressure "C," and the centrifugal force on the oil film. It may readily be calculated what value of $\Delta p$ is required to maintain these forces in equilibrium and thus prevent inward leakage of the oil film.

Many of the details herein described and illustrated may obviously be modified by those skilled in the art without necessarily departing from the spirit and scope of the invention as expressed in the appended claims.

What is claimed is:

1. In a machine, a housing containing a cooling gas under pressure, a shaft rotatably journaled in said housing, a flange on said shaft having an inwardly facing annular sealing surface perpendicular to the shaft axis, an annular sealing member surrounding said shaft inwardly of said flange in axially adjustable relation to the shaft, said sealing member having an outwardly facing annular sealing surface adjacent and opposed to the sealing surface on said flange, means constantly urging said sealing surfaces toward each other, at least two flexible packings positioned between said sealing member and said machine housing each providing a fluid-tight seal between said member and housing, one of said packings being closer to said flange than the other, the diameter of said packing closer to said flange being equal to the external diameter of said sealing surface interface between said sealing member and said flange, means for supplying oil to the space between said sealing surfaces under a pressure exceeding that of said cooling gas, and means independent of the thickness of the oil film between said sealing surfaces and responsive to the differential in said oil and gas pressures for varying the pressure at which oil is supplied to said space in order to maintain the differential between said oil and gas pressures constant at a predetermined value.

2. In a machine, the elements defined in claim 1 wherein said last-mentioned means comprises a pressure controlled valve in the oil supply means.

References Cited in the file of this patent

UNITED STATES PATENTS

| | | |
|---|---|---|
| 2,805,090 | Creek | Sept. 3, 1957 |
| 2,895,750 | Gardner | July 21, 1959 |
| 2,895,751 | Standish | July 21, 1959 |
| 2,907,594 | Macks | Oct. 6, 1959 |

FOREIGN PATENTS

| | | |
|---|---|---|
| 690,569 | Great Britain | Apr. 22, 1953 |